(12) United States Patent
Anspach

(10) Patent No.: US 8,152,180 B2
(45) Date of Patent: Apr. 10, 2012

(54) EXTENSION SYSTEM FOR HANDCART

(76) Inventor: Royal B. Anspach, Cave Creek, AZ (US)

( * ) Notice: Subject to any disclaimer, the term of this patent is extended or adjusted under 35 U.S.C. 154(b) by 53 days.

(21) Appl. No.: 12/799,673

(22) Filed: Apr. 29, 2010

(65) Prior Publication Data
US 2011/0266761 A1 Nov. 3, 2011

(51) Int. Cl.
B62B 1/02 (2006.01)
(52) U.S. Cl. .................................. 280/47.27
(58) Field of Classification Search ............. 280/33.992, 280/42, 43.1, 43.11, 43.14, 43.24, 47.131, 280/47.17, 47.19, 47.23, 47.24, 47.26, 47.27, 280/47.28, 63, 651, 652, 654, 659; 414/607; 410/46, 96, 97; 108/51.11, 57.1, 57.26; 312/244; 24/298, 299, 302
See application file for complete search history.

(56) References Cited

U.S. PATENT DOCUMENTS

| 1,181,377 | A | * | 5/1916 | Dowell | 410/97 |
| 2,546,876 | A | * | 3/1951 | Sutherland | 280/47.27 |
| 3,381,937 | A | * | 5/1968 | Zillman | 254/104 |
| 3,647,238 | A | * | 3/1972 | Mackey | 280/47.29 |
| 3,865,392 | A | * | 2/1975 | Hartway | 280/35 |
| 3,870,177 | A | * | 3/1975 | Cobb | 414/446 |
| 3,927,898 | A | * | 12/1975 | Weyrauch | 280/47.27 |
| 4,079,907 | A | * | 3/1978 | Mykleby | 410/46 |
| 4,318,661 | A | * | 3/1982 | Helm | 414/607 |
| 4,403,903 | A | * | 9/1983 | Cary | 414/607 |
| 5,221,176 | A | * | 6/1993 | Allen et al. | 414/785 |
| 5,366,339 | A | * | 11/1994 | Gould | 414/607 |
| 5,415,109 | A | * | 5/1995 | McBride | 108/57.29 |
| 5,575,608 | A | * | 11/1996 | Yau et al. | 414/607 |
| 5,603,591 | A | * | 2/1997 | McLellan | 410/97 |
| 6,024,374 | A | * | 2/2000 | Friesen | 280/511 |
| 6,059,512 | A | * | 5/2000 | Kielinski | 414/490 |
| 6,471,465 | B2 | * | 10/2002 | Albertyn | 414/785 |
| 6,543,794 | B1 | * | 4/2003 | Tyree | 280/33.992 |
| 6,663,136 | B2 | * | 12/2003 | Stevens | 280/511 |
| D493,597 | S | * | 7/2004 | Perry | D34/35 |
| 7,025,363 | B1 | * | 4/2006 | Leight | 280/47.27 |
| 7,104,554 | B2 | * | 9/2006 | Perras | 280/47.27 |
| 7,458,600 | B1 | * | 12/2008 | Berke et al. | 280/651 |
| 7,540,698 | B2 | * | 6/2009 | Ardo | 410/96 |
| 7,950,677 | B2 | * | 5/2011 | Buncy et al. | 280/33.992 |
| 2006/0182566 | A1 | * | 8/2006 | Russo | 414/444 |
| 2007/0257454 | A1 | * | 11/2007 | Ostrow et al. | 280/33.993 |
| 2008/0067766 | A1 | * | 3/2008 | Watson | 280/47.27 |
| 2009/0263228 | A1 | * | 10/2009 | Tygard | 414/800 |

* cited by examiner

Primary Examiner — John R. Olszewski
Assistant Examiner — Brodie Follman
(74) Attorney, Agent, or Firm — Tod R. Nissle, P.C.

(57) ABSTRACT

A hand cart includes an upright frame and a metal toe plate with a peripheral edge. The toe plate is slightly canted toward the ground when the cart is in a free-standing upright orientation. An extension unit slides onto the toe plate. The extension unit is canted slightly toward the ground when the cart is in a free-standing upright orientation. The extension unit include a plate and a strap. The plate is on top of the toe plate. The strap extends from the plate and down and beneath the toe plate. A fastener extends laterally from the toe plate and through the extension unit. The fastener secures the extension unit on the toe plates, generates a tensile force acting to displace the extension unit away from the peripheral edge of the toe plate, and generates compressive force which presses the extension unit against the toe plate.

1 Claim, 3 Drawing Sheets

*FIG. 6*
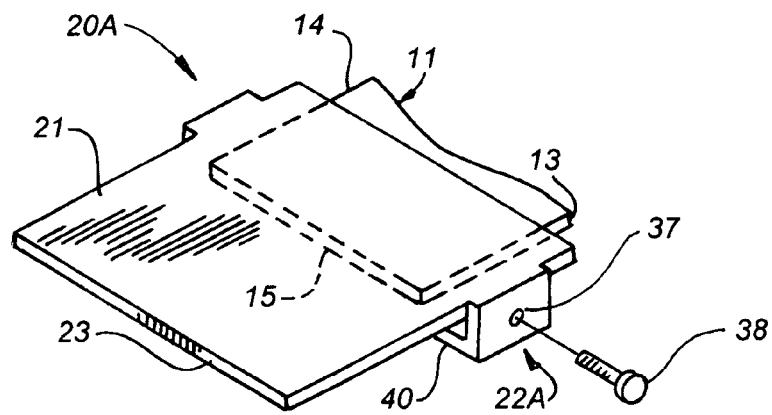
*FIG. 7*
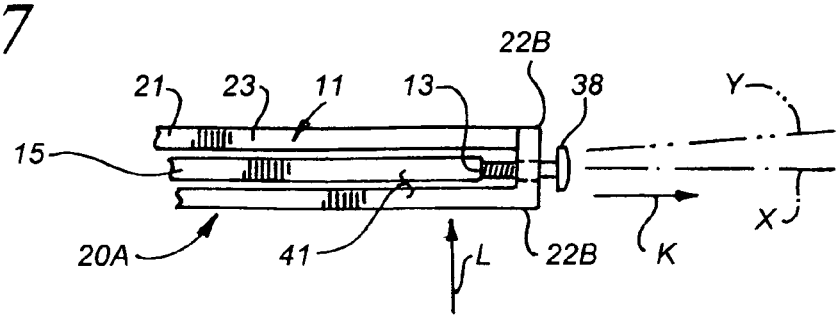
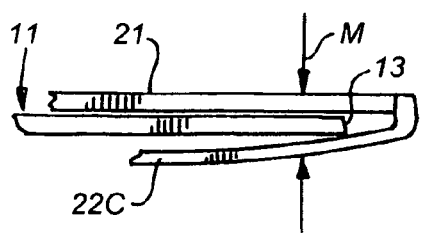
*FIG. 8*

EXTENSION SYSTEM FOR HANDCART

This invention pertains to hand carts.

The basic structure of hand carts has been known for decades and comprises a frame with an upper end and a lower end. A handle is attached to the upper end of the frame, and a pair of ground engaging wheels are secured to the lower end of the frame. A toe plate is also secured to the lower end of the frame. A long existing motivation in connection with hand carts has been to improve the structure and functioning of such carts.

Therefore, it is a principal object of the invention to provide an improved hand cart.

This, and other, further and more specific objects and advantages of the invention will be apparent from the following detailed description thereof, taken in conjunction with the drawings, in which.

Figure 2:
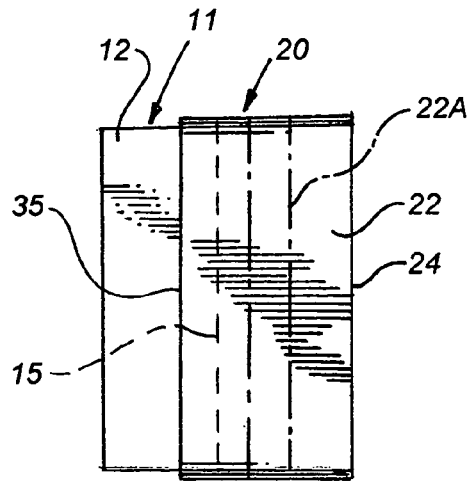
FIG. 2 is a bottom view further illustrating an extension unit utilized in the cart of FIG. 1.
Figure 3:
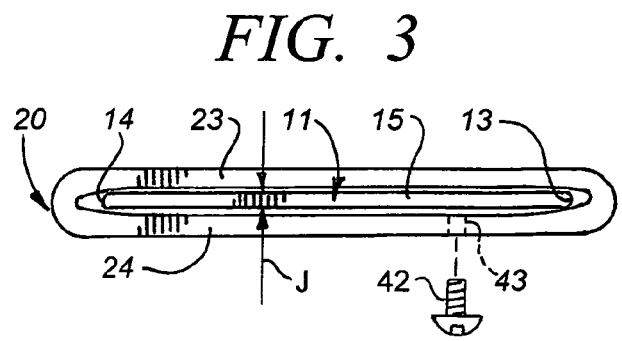
Figure 4:
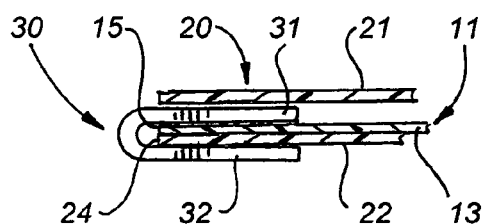
Figure 5:
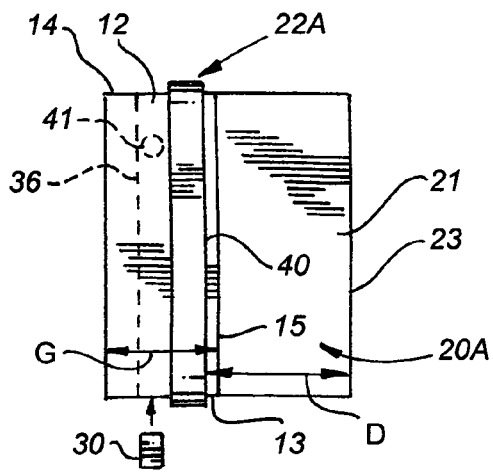

FIG. 3 front view of the extension unit of FIG. 2 further illustrating construction details thereof;

FIG. 4 is a side section view illustrating an alternate extension unit construction in accordance with the invention;

FIG. 5 is a bottom view illustrating still another alternate extension unit construction in accordance with the invention;

FIG. 6 is a perspective view illustrating a further embodiment of the invention;

FIG. 7 is partial front view of the apparatus of FIG. 6 illustrating construction details thereof; and, FIG. 8 is a front view illustrating still a further embodiment of the invention in which the extension unit is configured to pinch the toe plate of a cart.

Briefly, in accordance with the invention, I provide an improved hand cart. The cart includes an upright frame having an upper end and a lower end; a pair of ground engaging wheels attached to the lower end of the frame; a handle connected to the upper end of the frame; a thin, flat, smooth metal toe plate generally parallel to the ground and having an upper surface, a lower surface, a trailing edge connected to the frame, a leading edge, a first side edge extending between the leading edge and the trailing edge, and a second side edge spaced apart from the first side edge and extending between the leading edge and the trailing edge; a free-standing orientation in which said toe plate is slightly canted downwardly toward the ground such that said leading edge is closer to the ground than said trailing edge; and, an extension unit slidably mounted on the toe plate, and slightly angled downwardly toward the ground. The extension unit includes an upper thin, flat, smooth, substantially continuous metal plate having a rear edge and a front edge, having a width comprising the distance from the rear edge to the front edge, and extending over the upper surface and between and over the first and second side edges. The front edge is spaced apart from the leading edge and contacts the ground. The extension unit also includes a strap member having a width less than the width of the upper plate; spaced apart from the rear edge and the front edge of the upper plate; extending over the lower surface and between and over the first and second side edges; and having a control side adjacent the first side edge of the toe plate. The strap member and the upper member define an opening to slidably receive the leading edge of the toe plate. The hand cart also includes a fastener. The fastener extends through the control side, is positioned at least in part above the lower surface of the toe plate, and contacts the first side edge to simultaneously secure the toe plate to the upper plate at a selected point intermediate the leading and trailing edges of the toe plate, generate a tensile force acting to displace the control side away from the first side edge, and generate a compressive force acting to press together the metal plate of the extension unit and the upper surface of the toe plate.

Figure 1:
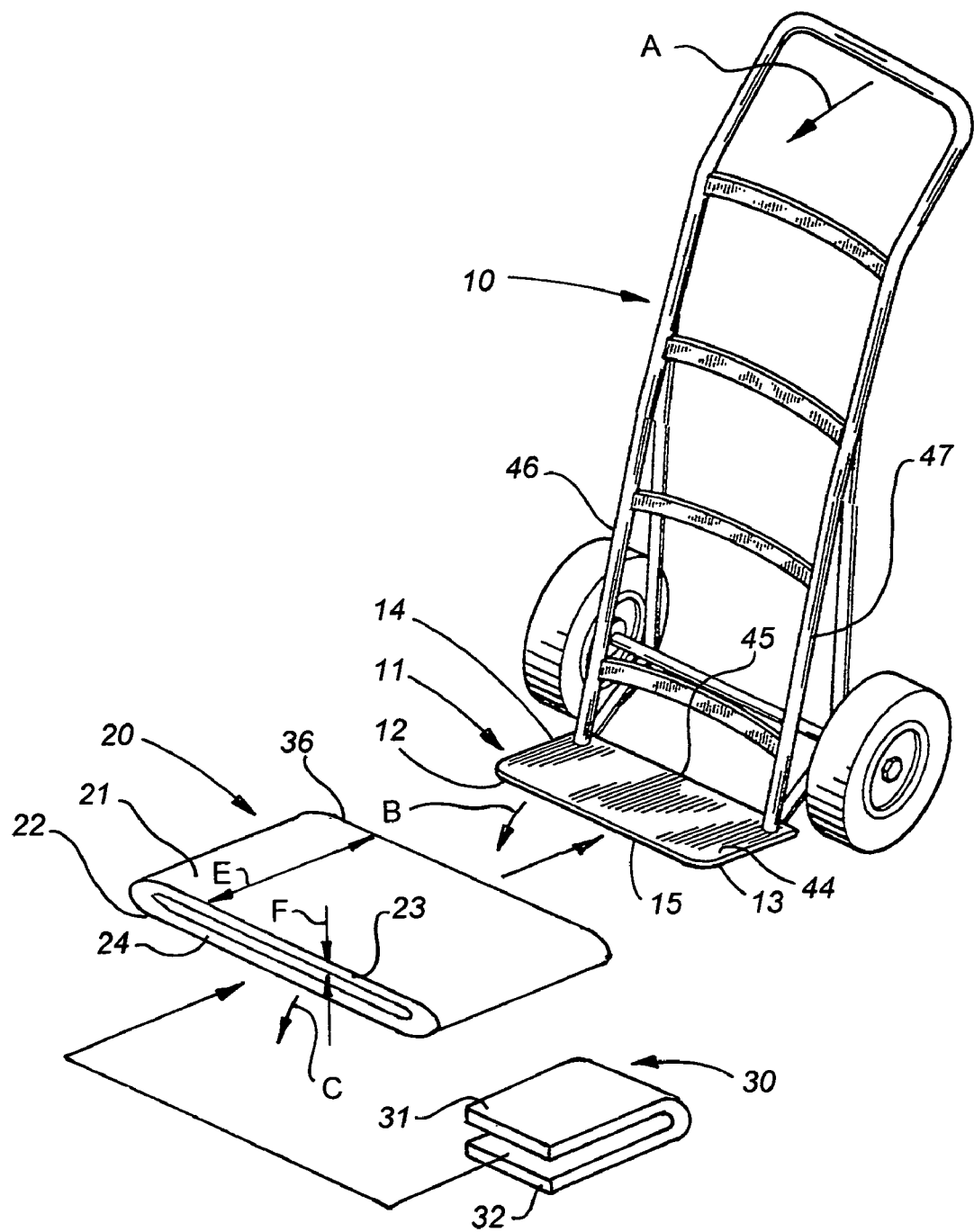
FIG. 1 is an exploded view illustrating a hand cart constructed in accordance with the principles of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates an upright free-standing hand cart generally indicated by reference character 10 and including a frame with an upper end and a lower end. A handle is connected to the upper end of cart 10 and is grasped and manipulated to operate and push and pull cart 10 in conventional fashion.

A thin, flat, smooth metal toe plate 11 is attached to and extends outwardly from the bottom of the frame of cart 10. Plate 11 has an upper surface 44 and a lower surface 12. Lower surface 12 is spaced apart from the upper surface and is adjacent the ground. Plate 11 includes trailing edge 45, leading edge 15, a first side edge 13 extending between the leading edge and trailing edge, and a second side edge 14 spaced apart from the first side edge and extending between the leading edge and trailing edge. When cart 10 is in the free-standing orientation of FIG. 1, plate 11 is slightly angled downwardly toward the ground such that leading edge 15 contacts the ground but trailing edge 45 does not.

Cart 10 also includes an extension unit 20 slidably mounted on the toe plate 11 and slightly angled downwardly toward the ground along with plate 11. Unit 20 is sufficiently angled toward the ground such that the front edge 24 (or 23 for the embodiment illustrated in FIG. 5) contacts the ground but the remainder of plate 22 does not contact the ground when cart 10 is in the free-standing upright orientation illustrating in FIG. 1. This is an important feature of unit 20. If edge 24 is spaced above the ground, sliding unit 20 under a box or piece of furniture or other object becomes an awkward proposition and increases the likelihood that a user will be injured. When cart 10 is free-standing in the manner illustrated in FIG. 1, cart 10 naturally slightly tilts in the direction indicated by arrows A, B, C so that edge 24 contacts the ground.

Unit 20 includes an upper thin, flat, smooth, substantially continuous metal plate 21 which has a rear edge 36, a front edge 23, and a width E; and, includes a lower thin, flat, smooth, substantially continuous metal bottom plate 22 which has rear edge 35 (FIG. 2) and a front edge 24 (FIG. 1). Plates 21 and 22 are connected along lateral parallel spaced apart edges by lips which extend or "wrap" around edges 13 and 14 when unit 20 is slid onto plate 11 to the position illustrated in FIG. 2. The thickness of plate 21 is indicated by arrow C (FIG. 1) and the thickness of toe plate 11 is indicated by arrows J (FIG. 3). Thicknesses C and J are in the range of 1/32 to 9/32 of an inch, preferably 12/32 to 6/32 of an inch, more preferably 3/32 to 5/32 of an inch. Unit 20 and plates 15 can be fabricated from any desired material but metal, in particular stainless steel, is presently preferred in the practice of the invention because a relatively thin piece of steel has significant strength. The thickness of plate 22 is comparable to that of plate 21.

The U-shaped clip 30 illustrated in FIG. 1 includes leading edges 31 and 32. In one embodiment of the invention, when extension 20 unit is mounted on plate 11, edges 15 and 24 are in registration and clip 30 is mounted in the manner illustrated in FIG. 4 to secure unit 20 on plate 15. In most preferred embodiments of the invention, however, the leading edge 23 or 24, as the case may be, is spaced apart from leading edge 15 in the manner illustrated in FIGS. 2 and 5.

Spaced apart plates 21 and 22 are connected to each other along opposing edges in the manner illustrated in FIG. 1 and form an opening which slidably receives at least a portion of plate 11 in the manner illustrated in FIG. 2. This kind of construction is further illustrated in FIG. 8 where an edge 13 of plate 11 is, as indicated by arrows M, squeezed or compressed between plate 21 and a strap 22C that is comparable to strap 22A. Strap 22C extends continuously across the bottom of late 11.

In one embodiment, plates 21 and 22 are interconnected such that when plate 15 is slid into the opening that exists between and is bounded by plates 21 and 22, plates 21 and 22 frictionally squeeze, or pinch, the edges 13 and 14 of plate 11 in the manner suggested in FIG. 3, this to, help secure plate 11 in unit 20. In another embodiment of the invention, an internally threaded aperture 43 is formed through plate 22 (or plate 21) to receive externally threaded set screw 42. Set screw 42 is turned through aperture 43 and against plate 11 to secure unit 20 to plate 11. Alternatively, in the embodiment of the invention illustrated in FIG. 5, an internally threaded aperture 41 can be formed through plate 11 such that a set screw can be turned through aperture 41 against plate 21 to secure plate 21 on plate 11.

In the embodiment of the invention illustrated in FIG. 5, bottom plate 22 is replaced by one or more strap(s) 22A. Each strap 22A is connected at its ends to plate 21 to form an opening intermediate strap 22A and plate 21 through which the forward portion of toe plate 11 is slidably inserted to the position illustrated in FIG. 5. Strap 22A is presently, but not necessarily, spaced apart both from the trailing edge 36 and the leading edge 23 of plate 21.

The distance D at which the leading edge 15 of toe plate 11 is spaced apart from the leading edge 23 of top plate 21 in FIG. 5 is sufficient to permit the leading edge 23 to contact the ground when cart 10 is in the free-standing upright orientation of FIG. 1 and is tilted slightly in the direction of arrows A to C with each of the wheels contacting the ground. In order for this to occur, not only must the distance D be sufficiently great, but (1) plate 11 must be attached to the bottom of the frame such that it slightly downwardly cants (away from the cart wheels) toward the ground; and, (2) the thickness of strap 22A and the thickness, indicated by arrows J in FIG. 3, of toe plate 11 must be relatively small, typically in the range of 1/32 to 9/32 of an inch, preferably in the range of 1/32 to 5/32 of an inch. If the thickness of strap 22A and plate 15 is too great, then when cart 10 is in the free-standing orientation of FIG. 1 strap 22A contacts the ground and plate 11 spaces edge 23 a greater distance above the ground. This prevents plate 11 from being downwardly canted with respect to the ground so that the leading edge 15 of plate 11 is closer to the ground than the trailing edge 45 and so that the edge 23 (FIG. 5 and 6) or 24 (FIG. 1), as the may be, contacts the ground when cart 10 is in the free standing orientation of FIG. 1. If plate 11 is prevented from being downwardly canted, then plate 21 is prevented from being canted toward the ground so that leading edge 24 (FIG. 1) or 23 (FIG. 6) contacts the ground. When cart 10 is in the free-standing orientation of FIG. 1 and tilts slightly forward in the direction of arrow A (FIG. 1), leading edge 24 (FIG. 1) or 23 (FIGS. 5 and 6) contacts the ground, and plate 11 and strap 22A preferably do not contact the ground. This minimizes frictional contact and drag produced by plate 11 and strap 22A. The increased constructive length produced by mounted unit 20 on plate 11 increases the leverage which can, at leading edge 23, be produced when cart 10 is, during use, tilted rearwardly to pivot the cart frame, plate 11, and extension unit 20, 20A about the axle extending through the ground engaging wheels of the frame. Utilizing strap 22A instead of plate 22 facilitates the objective of having edge 23 contact the ground when cart 10 is in the free standing orientation of FIG. 1.

In still a further embodiment of the invention, edge 23 is shaped and dimension to contact the ground when cart 10 is in the free standing orientation of FIG. 1, regardless of whether plate 11 does or does not downwardly cant toward the ground. For example, the forward portion of plate 21 near leading edge 23 (FIG. 6) or 24 (FIG. 1) can be downwardly bent, or canted, with respect to the rear portion of plate 21 that extends from the front portion back to trailing edge 36. The forward portion of plate 21 is bent an amount sufficient for the leading edge 23 or 24 to contact the ground when cart 10 is in the free standing orientation of FIG. 1—even if, for example, strap 22A contacts the ground when plate 11 is parallel to the ground and the wheels of the cart are contacting the ground.

In the embodiment of the invention illustrated in FIGS. 6 and 7, extension unit 20A is slid onto toe plate 11 such that forward edge 15 is at a location intermediate strap 22A and leading-edge 23, and such that plate 11 extends intermediate plate 21 and strap 22A. Screw 38 is turned through internally threaded aperture 37 against edge 13 to generate a tensioning force acting outwardly away from edge 13 in the direction of arrow K and to secure unit 20A in position on plate 11. Force K tends to push away from edge 13 the portion of strap 22A that is positioned laterally from edge 13 and, consequently, tends to tension the portion of strap 22A extending beneath plate 11.

Unit 20A can be constructed such that tightening screw 38 against edge 13 also functions to generate a compressive force which pulls or otherwise displaces strap 22B upwardly in the direction of arrow L against plate 11. In FIG. 7, the longitudinal axis X of screw 38 is perpendicular to edge 13. Aperture 37 can, if desired, be canted such that the longitudinal axis of screw 38 is coincident with axis Y. When the longitudinal axis of screw 38 is coincident with axis Y, then tightening screw 38 against edge 13 generates a compressive force component which acts in the direction indicated by arrow L and which tends to displace upwardly in the direction of arrow L against bottom surface 12 the portion of strap 22B that extends beneath plate 11 near edge 13. This compressive force component facilitates compressing and "pinching" the edge of plate 11 between plate 21 and strap 22B to generate frictional forces which interact between plate 11 and plate 21 and strap 22B and which function to maintain unit 20A on plate 11 in the position illustrated in FIG. 6.

Axis Y is canted upwardly from axis X. Alternatively, axis Y can be canted downwardly from axis X and the longitudinal axis of screw or fastener 38 be coincident with such a downwardly canted axis Y so that tightening screw 38 against edge 13 or another portion of plate 11 generates a force that acts in a direction opposite that of arrow L, that tends to pull plate 21 downwardly in a direction opposite that of arrow L, and that presses plate 21 against the upper surface 44 of plate 11 to generate frictional forces which interact between plates 11 and 21 and function to maintain unit 20A on plate 11 in the position illustrated in FIG. 6.

Placing fastener(s) 38 at the side of unit 20A and laterally from edge 13 (or edge 14)—instead of below plate 11 like fastener 42 is in FIG. 3 or above plate 11—prevents the head of the fastener from potentially catching on an article placed on plate 21 or catching on carpet or another surface beneath strap 22B. It also facilitates using fastener 38 to tension strap 22A and generate compressive force which act in the direction of arrow L to press strap 22B against the bottom surface 12 of plate 11 and/or act in a direction opposite that of arrow L to press plate 21 against the top surface 44 of plate 11.

In FIG. 2 edge 35 is spaced apart from the points at which the bottom of each leg 46, 47 (FIG. 1) is connected to plate 11. Alternatively, to provide greater stability, unit 20 can be slid onto plate 11 such that edge 35 (and edge 36) contact the bottom of each leg 46, 47.

In FIGS. 2 to 8 the only portions of cart 10 illustrated are the toe plate 11 and associated extension unit.

Having described my invention in such terms as to enable those of skill in the art to understand and use it, and having described the presently preferred embodiments and best mode thereof,

I claim:

1. A hand cart including
   (a) a upright frame having an upper end and a lower end;
   (b) a pair of ground engaging wheels attached to said lower end of said frame,
   (c) a handle connected to said upper end of said frame, and
   (d) a thin, flat, smooth metal toe plate and having an upper surface, a lower surface, a trailing edge connected to said frame, a leading edge, a first side edge extending between said leading edge and said trailing edge, and a second side edge spaced apart from said first side edge and extending between said leading edge and said trailing edge;
   (e) a free-standing orientation in which said toe plate is slightly canted toward the ground such that said leading edge is closer to the ground than said trailing edge;
   (f) an extension unit slidably mounted on said toe plate, slightly angled downwardly toward the ground when said cart is in said free-standing orientation, and including
      (i) an upper thin, flat, smooth, substantially continuous metal plate
         having a rear edge and a front edge,
         having a width comprising the distance from said rear edge to said front edge,
         extending over said upper surface and between and over said first and second side edges,
         said front edge spaced apart from said leading edge and contacting the ground,
      (ii) a strap member
         having a width less than said width of said upper plate,
         spaced apart from said rear edge and said front edge of said upper plate,
         extending over said lower surface and between and over said first and second side edges,
         having a control side adjacent said first side edge of said toe plate,
         said strap member and said upper member defining an opening to slidably receive said leading edge of said toe plate; and,
      (iii) a fastener extending through said control side, positioned at least in part above said lower surface of said toe plate, and contacting said first side edge to simultaneously
         secure said toe plate to said upper plate at a selected point intermediate said leading and trailing edges of said toe plate,
         generate a tensile force acting to displace said control side away from said first side edge, and
         generate a compressive force acting to press together said metal plate of said extension unit and said upper surface of said toe plate.

* * * * *